US012627905B2

(12) United States Patent
  Kalyanasundaram et al.

(10) Patent No.: US 12,627,905 B2
(45) Date of Patent: May 12, 2026

(54) METHOD AND SYSTEM FOR ESTIMATING AUTO-FOCUS DISPARITY IN A CMOS IMAGE SENSOR

(71) Applicant: Samsung Electronics Co., Ltd., Suwon-si (KR)

(72) Inventors: Girish Kalyanasundaram, Bengaluru (IN); Sreeja J, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 18/828,189

(22) Filed: Sep. 9, 2024

(65) Prior Publication Data
  US 2025/0324169 A1 Oct. 16, 2025

(30) Foreign Application Priority Data
  Apr. 12, 2024 (IN) .............................. 202441029873

(51) Int. Cl.
  *H04N 25/704* (2023.01)
  *H04N 23/67* (2023.01)
(52) U.S. Cl.
  CPC ......... *H04N 25/704* (2023.01); *H04N 23/672* (2023.01)
(58) Field of Classification Search
  CPC ........ H04N 23/672; H04N 25/704; G01J 9/00
  USPC ....................................................... 348/345
  See application file for complete search history.

(56) References Cited

U.S. PATENT DOCUMENTS

| | | | |
|---|---|---|---|
| 8,953,091 | B2 | 2/2015 | Hamada |
| 9,392,160 | B2 | 7/2016 | Sfaradi et al. |
| 9,807,294 | B2 | 10/2017 | Liu et al. |
| 10,044,926 | B2 | 8/2018 | Galor Gluskin et al. |
| 10,070,042 | B2 | 9/2018 | Nikkanen et al. |
| 10,397,465 | B2 | 8/2019 | Galor Gluskin et al. |

(Continued)

FOREIGN PATENT DOCUMENTS

WO WO-2013168658 A1 * 11/2013 ........... H04N 25/134

OTHER PUBLICATIONS

D. Fleet et al. 'Phase-Based Disparity Measurement' CVGIP: Image Understanding, Academic Press Inc., vol. 53, No. 2, Mar., pp. 198-210, 1991.

(Continued)

*Primary Examiner* — Anthony J Daniels
(74) *Attorney, Agent, or Firm* — Fish & Richardson P.C.

(57) ABSTRACT

Disclosed is a method for estimating an Auto-Focus (AF) disparity in Complementary Metal-Oxide-Semiconductor (CMOS) image sensor. The method includes acquiring left phase AF pixel data and right phase AF pixel data from a pixel array of the CMOS image sensor and generating difference channel signal and sum channel signal by pre-processing the left and right AF pixel data. The method includes filtering the difference channel signal and the sum channel signal and calculating a First-Order Derivative (FOD) of the sum channel signal. The method includes generating a T-processing signal based on a product of the difference channel signal and the sum channel signal and determining, within the generated T-processing signal, a plurality of peak locations exceeding a dynamic threshold value and estimating the AF disparity based on the plurality of peak locations and the FOD of the sum channel signal.

20 Claims, 8 Drawing Sheets

(56)           References Cited

U.S. PATENT DOCUMENTS

| | | | |
|---|---|---|---|
| 11,314,150 B2 | 4/2022 | Galor Gluskin | |
| 11,653,092 B2 | 5/2023 | Hung et al. | |
| 2013/0286275 A1* | 10/2013 | Ogawa .................. | H04N 5/265 |
| | | | 348/345 |
| 2021/0067703 A1 | 3/2021 | Kadambala et al. | |

OTHER PUBLICATIONS

M. Jenkin 'Techniques for Disparity Measurement' CVGIP: Image Understanding, Academic Press Inc., vol. 53, No. 1, Jan., pp. 14-30, 1991.

* cited by examiner

FIG. 1B

L/R AF Image

ROI

Window 0
Window 1
Window 2

Each window
has multiple rows

FIG. 7

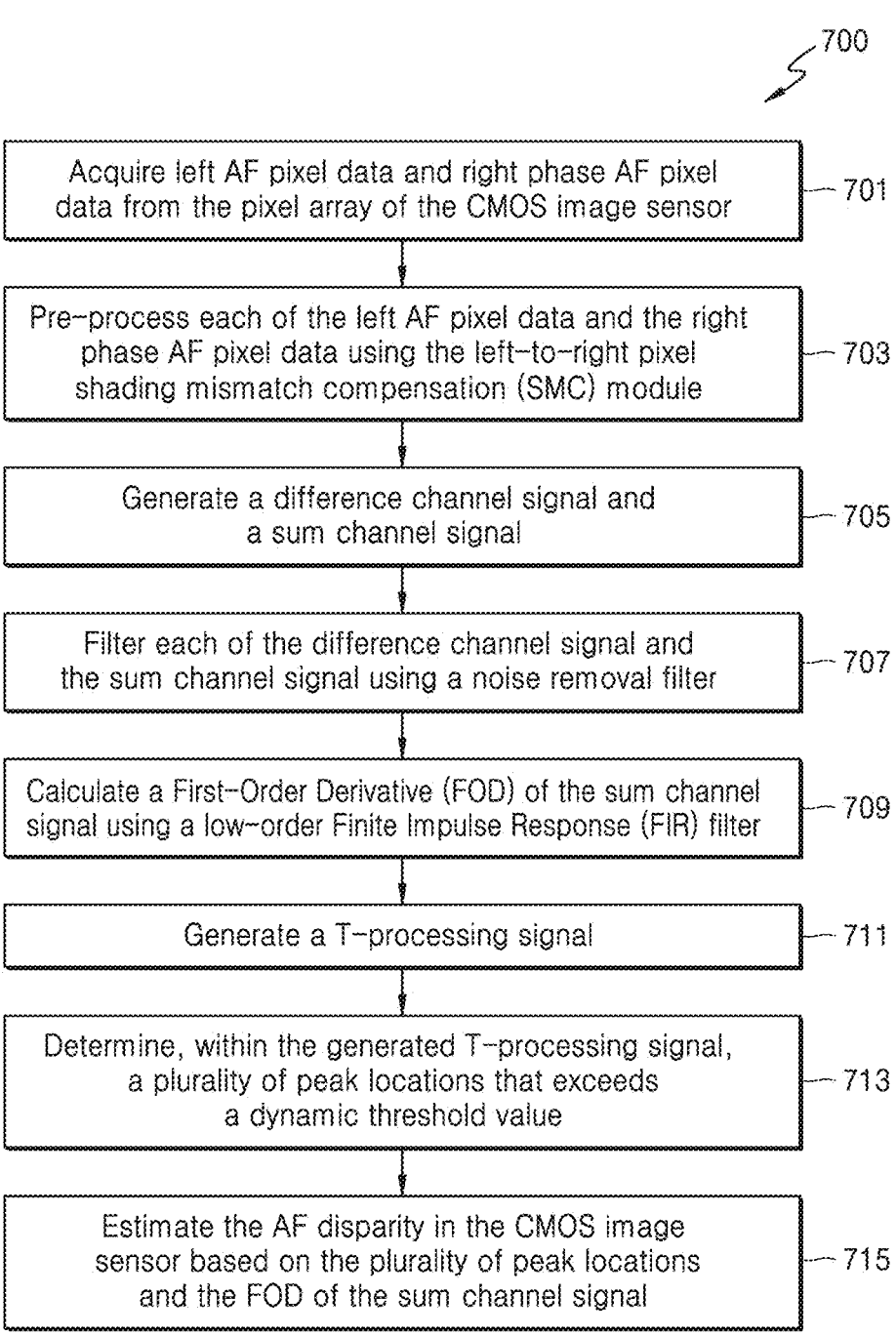

700

| | |
|---|---|
| Acquire left AF pixel data and right phase AF pixel data from the pixel array of the CMOS image sensor | — 701 |

↓

| | |
|---|---|
| Pre-process each of the left AF pixel data and the right phase AF pixel data using the left-to-right pixel shading mismatch compensation (SMC) module | — 703 |

↓

| | |
|---|---|
| Generate a difference channel signal and a sum channel signal | — 705 |

↓

| | |
|---|---|
| Filter each of the difference channel signal and the sum channel signal using a noise removal filter | — 707 |

↓

| | |
|---|---|
| Calculate a First-Order Derivative (FOD) of the sum channel signal using a low-order Finite Impulse Response (FIR) filter | — 709 |

↓

| | |
|---|---|
| Generate a T-processing signal | — 711 |

↓

| | |
|---|---|
| Determine, within the generated T-processing signal, a plurality of peak locations that exceeds a dynamic threshold value | — 713 |

↓

| | |
|---|---|
| Estimate the AF disparity in the CMOS image sensor based on the plurality of peak locations and the FOD of the sum channel signal | — 715 |

1

METHOD AND SYSTEM FOR ESTIMATING AUTO-FOCUS DISPARITY IN A CMOS IMAGE SENSOR

CROSS-REFERENCE TO RELATED APPLICATION

This application is based on and claims priority under 35 U.S.C. § 119 to Indian Patent Application No. 202441029873, filed on Apr. 12, 2024, in the Indian Intellectual Property Office, the disclosure of which is incorporated by reference herein in its entirety.

TECHNICAL FIELD

Various example embodiments generally relate to the field of semiconductor devices, and more particularly relates to a method and a system for estimating auto-focus disparity in a Complementary Metal-Oxide-Semiconductor (CMOS) image sensor.

DISCUSSION OF RELATED ARTS

In the realm of photography and imaging, achieving precise focus plays a significant role in capturing high-quality images. One such technique is phase-difference Auto-Focus (AF), which utilizes specialized sensor elements known as AF pixels. The AF pixels are designed to receive only one of either a half, quarter, or other such fraction of a beam of incoming light. An image which is aggregated from a set of AF pixels collecting a fraction of a beam of light coming from one particular path is spatially displaced from an image which is aggregated from a set of AF pixels collecting a fractional beam of light coming from a different path. This spatial displacement between the AF pixels is known as disparity or phase-difference, which forms a basis of phase-difference AF and is essential for determining necessary (or advantageous) lens adjustment required to achieve the AF.

Further, to direct the lens accurately, the phase difference captured by the AF pixels is analyzed by a camera autofocus system. By comparing the phase difference between the two slightly displaced images, the camera autofocus system can calculate a direction and magnitude of the lens adjustment needed to achieve the AF. FIG. 1A illustrates an example scenario depicting a relationship between lens displacement and disparity in the phase-difference AF of a conventional camera autofocus system, in accordance with related arts. As shown in FIG. 1A, the overall method for estimating the disparity in the phase-difference AF involves analyzing a phase difference between two images captured by the AF pixels (e.g., left and right AF pixels) of a sensor matrix of the conventional camera autofocus system. This phase difference represents a disparity or a difference in a light path between the two images. By analyzing this disparity (D), the conventional camera autofocus system can determine a degree of focus adjustment required to achieve sharp focus and thereby generate a resulting image. Further, a detailed example flow of the conventional method for estimating the disparity in the phase-difference AF of the conventional camera autofocus system is also shown in FIG. 2, in accordance with related arts.

As shown in FIG. 2, the conventional method for estimating the disparity in the phase-difference AF involves acquiring pixel data from a pixel array and feeding the pixel data to an Image Signal Processor (ISP), which is responsible for pre-processing the pixel data at a front end captured by the image sensor. Further, during the pre-processing, the ISP extracts luma components of the pixel data specifically for estimating the disparity. Thereafter, the luma components of the pixel data are analyzed to estimate a phase difference between two images (e.g., left AF image and right AF image) corresponding to the AF pixels of the pixel data (e.g., left and right AF pixels). This estimated phase difference represents the disparity or the difference in the light path between the two images. Thus, the disparity is estimated and the estimated disparity is mapped to lens displacement in order to inform an AF actuator of the conventional camera autofocus system for new lens position.

Further, another conventional method for estimating the disparity in the phase-difference AF involves cost-function-based disparity estimation. The cost-function-based disparity estimation involves generating a cost function that measures a difference between captured phase information and a reference phase. By computing a minimum (or reduced) value of the cost function, the conventional camera autofocus system can determine an optimal focus position. A conventional method of cost-function based disparity estimation is shown in FIG. 1B of the drawings in accordance with related arts. As shown in FIG. 1B, at first, a typical value of cost-function is calculated between right AF pixels and left AF pixels to estimate the disparity in the phase-difference AF. Thereafter, for each value of estimated disparity, the left and right AF images are shifted with respect to a minimum (or reduced) cost function in order to map the estimated disparity to lens displacement.

Furthermore, as technology advances, there is an increasing demand for AF algorithms to be integrated into sensor hardware, allowing for more efficient and streamlined autofocus capabilities. The need for fast and reliable autofocus convergence is particularly important in scenarios with high motion, often captured at high frame rates. In such situations, ensuring rapid and accurate focus tracking becomes a crucial aspect of capturing clear and sharp images.

The above-discussed conventional methods for estimating the disparity in the phase-difference AF rely on a correlation search based on the phase difference to determine the disparity between the two images and, consequently, a degree of defocus present between the two images. Also, the computation of the minimum (or reduced) value of the cost function, a computational complexity of the conventional camera autofocus system multiplies with increasing magnitude of disparity (e.g., for larger defocuses). In addition, in the conventional camera autofocus system, zero-disparity does not coincide with maximum (or advantageous) image sharpness (e.g., focus). This error needs calibration at a module level of the conventional camera autofocus system.

Therefore, there lies a need (e.g., it is beneficial) for a method and a system that can reduce or eliminate (or prevent) the search-based method, directly estimate the disparity between images with fewer computations, and avoid the need for zero-error calibration.

SUMMARY

This summary is provided to introduce a selection of concepts, in a simplified format, that are further described in the detailed description section below. This summary is neither intended to identify key or essential example embodiments nor is it intended to determine the scope of the present inventive concepts.

Some example embodiments of inventive concepts provide a method for estimating an Auto-Focus (AF) disparity in a Complementary Metal-Oxide-Semiconductor (CMOS)

image sensor. The method includes acquiring left AF pixel data and right phase AF pixel data from a pixel array of the CMOS image sensor, pre-processing each of the left AF pixel data and the right phase AF pixel data using a left-to-right pixel shading mismatch compensation (SMC) module, generating a difference channel signal and a sum channel signal based on the processed left AF pixel data and the processed right AF pixel data, filtering each of the difference channel signal and the sum channel signal using a noise removal filter, calculating a First-Order Derivative (FOD) of the sum channel signal using a low-order Finite Impulse Response (FIR) filter, generating a T-processing signal based on a product of the filtered difference channel signal and the filtered sum channel signal, determining, within the generated T-processing signal, a plurality of peak locations that exceeds a dynamic threshold value, and estimating the AF disparity in the CMOS image sensor based on the determined plurality of peak locations, the filtered difference channel, and the calculated FOD of the sum channel signal.

Some example embodiments of inventive concepts provide a camera autofocus system. The system includes a Complementary Metal-Oxide-Semiconductor (CMOS) image sensor including a pixel array, a left-to-right pixel shading mismatch compensation (SMC) module, and at least one processor communicatively coupled with the CMOS image sensor and the SMC module. The at least one processor is configured to acquire left Auto-Focus (AF) pixel data and right phase Auto-Focus (AF) pixel data from the pixel array of the CMOS image sensor, pre-process each of the left phase AF pixel data and the right phase AF pixel data using the SMC module, generate a difference channel signal and a sum channel signal based on the processed left AF pixel data and the processed right AF pixel data, filter each of the difference channel signal and the sum channel signal using a noise removal filter, calculate a First-Order Derivative (FOD) of the sum channel signal using a low-order Finite Impulse Response (FIR) filter, generate a T-processing signal based on a product of the filtered difference channel signal and the filtered sum channel signal, determine, within the generated T-processing signal, a plurality of peak locations that exceeds a dynamic threshold value, and estimate an Auto-Focus (AF) disparity in the CMOS image sensor based on the determined plurality of peak locations, the filtered difference channel, and the calculated FOD of the sum channel signal.

Some example embodiments of inventive concepts provide a Complementary Metal-Oxide-Semiconductor (CMOS) image sensor. The Complementary Metal-Oxide-Semiconductor (CMOS) image sensor includes a pixel array, a left-to-right pixel shading mismatch compensation (SMC) module, and at least one processor operatively coupled to the SMC module, wherein the at least one processor is configured to acquire left phase Auto-Focus (AF) pixel data and right phase Auto-Focus (AF) pixel data from the pixel array, pre-process each of the left phase AF pixel data and the right phase AF pixel data using the SMC module, generate a difference channel signal and a sum channel signal based on the processed left phase AF pixel data and the processed right phase AF pixel data, filter each of the difference channel signal and the sum channel signal using a noise removal filter, calculate a First-Order Derivative (FOD) of the sum channel signal using a low-order Finite Impulse Response (FIR) filter, generate a T-processing signal based on a product of the filtered difference channel signal and the filtered sum channel signal, determine, within the generated T-processing signal, a plurality of peak locations that exceeds a dynamic threshold value, and estimate an Auto- Focus (AF) disparity in the CMOS image sensor based on the determined plurality of peak locations the filtered difference channel, and the calculated FOD of the sum channel signal.

BRIEF DESCRIPTION OF THE DRAWINGS

These and other features, aspects, and advantages of the present inventive concepts will become better understood when the following detailed description is read with reference to the accompanying drawings in which like characters represent like parts throughout the drawings, wherein:

Figure 1B:
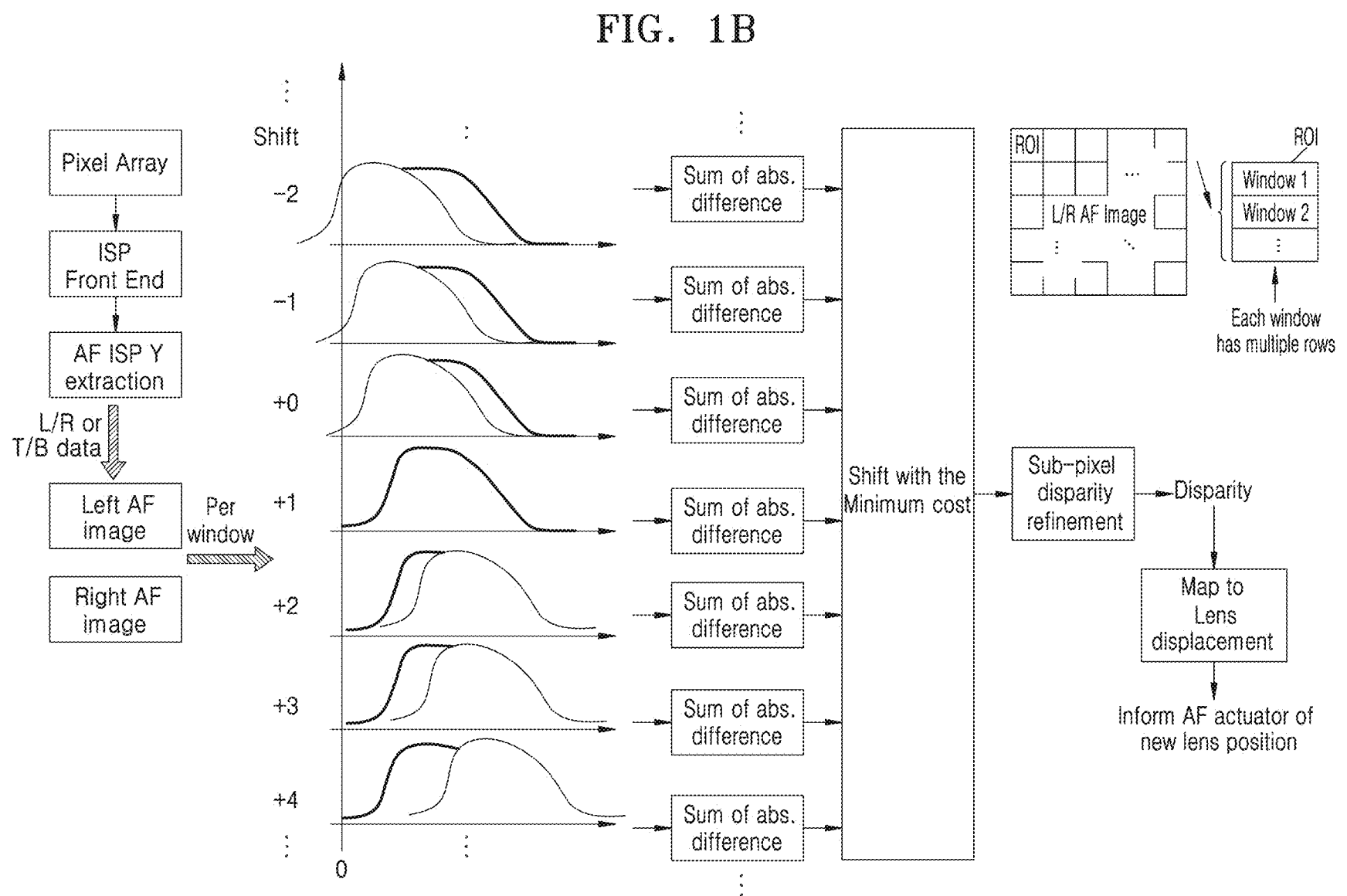

FIG. 1B illustrates a conventional method of cost-function based disparity estimation, in accordance with related arts;

FIG. 7 illustrates a flow chart of the method for estimating the AF disparity in the CMOS image sensor, according to some example embodiments.

Figure 1A:
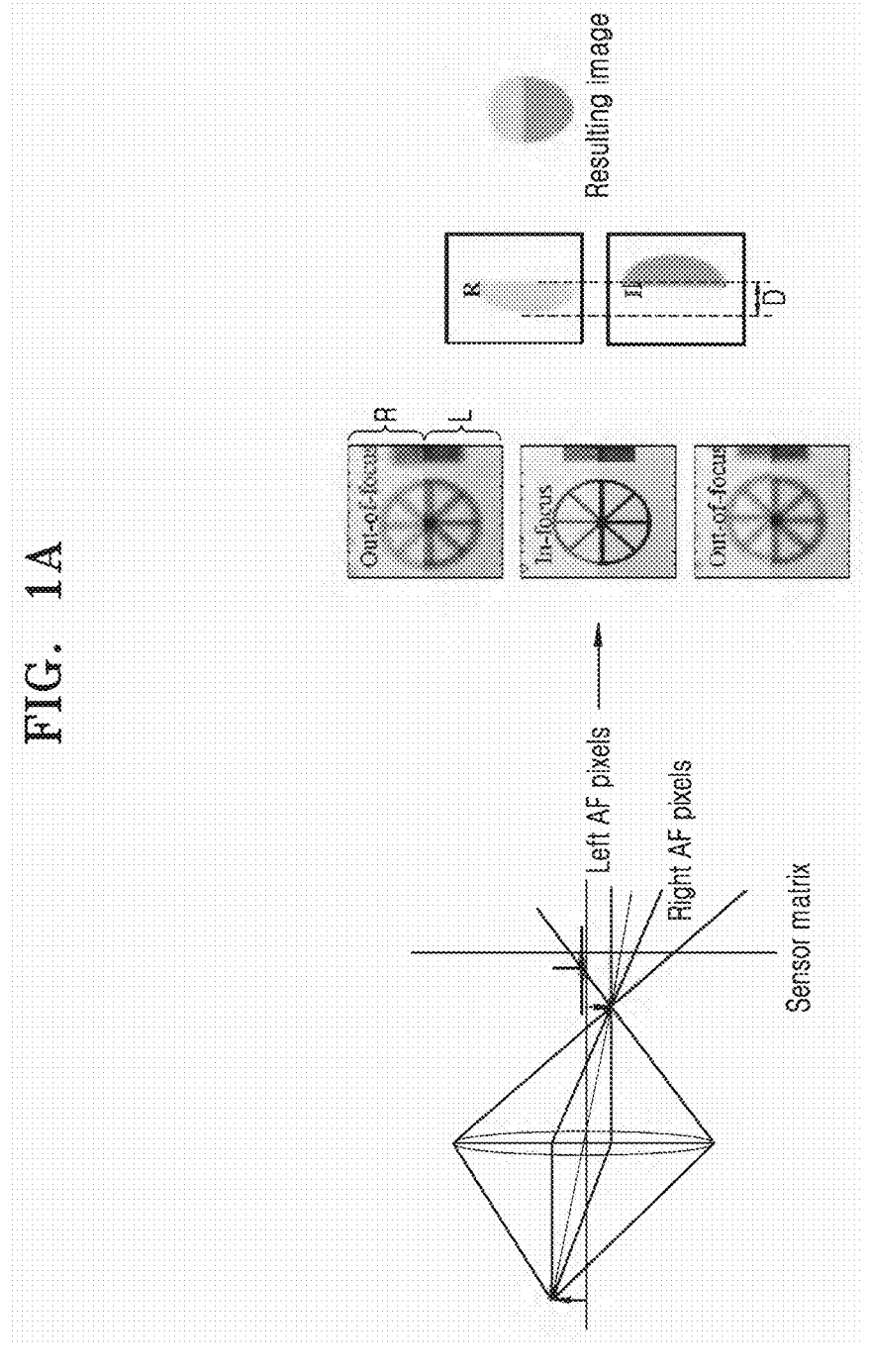
FIG. 1A illustrates an example scenario depicting a relationship between lens displacement and disparity in a phase-difference AF of a conventional camera autofocus system, in accordance with related arts.
Figure 2:
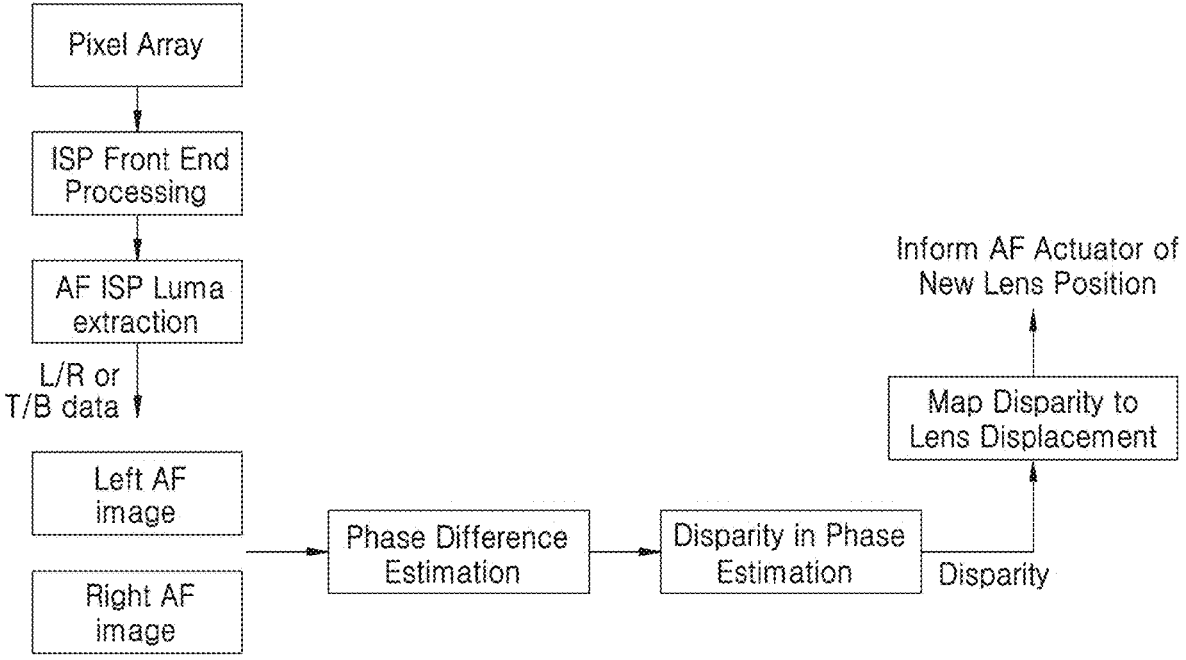
FIG. 2 illustrates an example flow chart of the conventional method for estimating the disparity in the phase-difference AF of the conventional camera autofocus system, in accordance with related arts.

Further, skilled artisans will appreciate that elements in the drawings are illustrated for simplicity and may not have necessarily been drawn to scale. For example, the flow charts illustrate some example embodiments in terms of the steps involved to help improve understanding of some inventive concepts. Furthermore, regarding construction or assembly of some example embodiments, one or more components of some example embodiments may have been represented in the drawings by conventional symbols, and the drawings may show only those specific details that are pertinent (or beneficial) to understanding some example embodiments of the present inventive concepts. Additionally, details that will be readily apparent to those of ordinary skill in the art have been omitted from the drawings.

DETAILED DESCRIPTION

Hereinafter, reference will be made to various example embodiments and specific language will be used to describe the same. It will nevertheless be understood that no limitation of the scope of the present inventive concepts is thereby intended, such that the inventive concepts do not have to be configured as limited to the various example embodiments described below and may be embodied in various forms. The following various example embodiments are not provided to fully complete the inventive concepts, but rather to fully convey the scope of the inventive concepts to those of ordinary skill in the art.

The following detailed description is provided to assist the reader in gaining a comprehensive understanding of the method and device described herein. However, various changes, modifications, and equivalents of the method and/or device described herein will be apparent for those skilled in the art. For example, the sequences of operations described herein are merely examples, and are not limited to those set forth herein, but may be changed as will be apparent after an understanding of the disclosure of this application, with the exception of operations necessarily occurring in a certain order or which are advantageous to occur in a certain order. Also, descriptions of features that are known in the art may be omitted for increased clarity and conciseness.

The terms "an embodiment", "example embodiment", "some example embodiments", or "in one or more embodiments" may refer to one embodiment, several embodiments, some example embodiments, or all embodiments. Accordingly, the term "some example embodiments" is defined as meaning "one embodiment, or more than one embodiment, or all embodiments."

The terminology and structure employed herein are for describing, teaching, and illuminating some example embodiments and their specific features and elements and do not limit, restrict, or reduce the spirit and scope of the claims or their equivalents. The phrase "exemplary" may refer to an example.

The terminology used herein is for describing various examples embodiments only and is not to be used to limit the present inventive concepts. The articles "a," "an," and "the" are intended to include the plural forms as well, unless the context clearly indicates otherwise. Further, any terms used herein such as but not limited to "includes," "comprises," "has," "have," "corresponds to", "associated with," and grammatical variants thereof do not specify an exact limitation or restriction and do not exclude the possible addition of one or more features or elements, unless otherwise stated, and must not be taken to exclude the possible removal of one or more of the listed features and elements, unless otherwise stated with the limiting language "must comprise" or "needs to include".

Whether or not a certain feature or element was limited to being used only once, either way, it may still be referred to as "one or more features", "one or more elements", "at least one feature", or "at least one element." Furthermore, the use of the terms "one or more" or "at least one" feature or element does not preclude there being none of that feature or element unless otherwise specified by limiting language such as "there needs to be one or more" or "one or more element is required."

Unless otherwise defined, all terms, and especially any technical and/or scientific terms, used herein may be taken to have the same meaning as commonly understood by one having ordinary skill in the art.

Various example embodiments of the present inventive concepts will be described below in detail with reference to the accompanying drawings.

Figure 3:
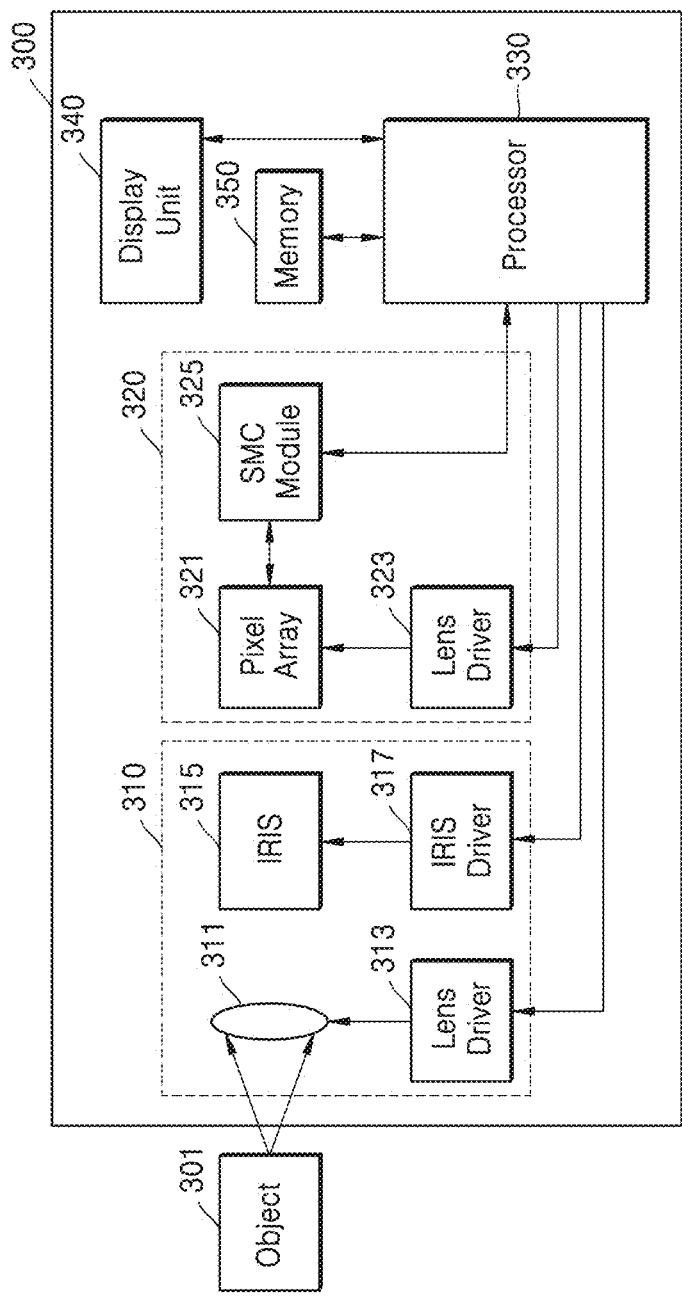
FIG. 3 is a block diagram illustrating a camera autofocus system for estimating an AF disparity in a CMOS image sensor, according to an example embodiment.

FIG. 3 is a block diagram illustrating a camera autofocus system 300 for estimating an AF disparity in a Complementary Metal-Oxide-Semiconductor (CMOS) image sensor, according to an example embodiment. An example of the camera autofocus system 300 includes but is not limited to, a digital camera, a smartphone, a camcorder, a high-end webcam, a mirrorless camera, an action camera, a drone camera, a surveillance camera, or a video conferencing system.

Referring to FIG. 3, the camera autofocus system 300 includes a photographing unit 310, a CMOS image sensor 320, a processor 330 (e.g., a central processing unit (CPU)), a display unit 340, and a memory 350. The photographing unit 310 includes a lens 311, a lens driver 313, an Integrated Remote Imaging System (IRIS) 315, and an IRIS driver 317 as components for receiving light from outside the camera autofocus system 300 to capture an image of an object 301. The CMOS image sensor 320 may include a pixel array 321, a controller 323, and a left-to-right pixel shading mismatch compensation (SMC) module 325. Operations of the camera autofocus system 300 may be controlled by the processor 330. The processor 330 may provide one or more control signals for operations of each component to the lens driver 313, the iris driver 317, the controller 323, the SMC module 325, and the like.

The lens driver 313 may adjust a position of the lens 311 according to the control signal provided by the processor 330. The lens driver 313 may move the lens 311 in a direction in which a distance of the lens 311 from the object 301 increases or decreases. Thereby, the distance between the lens 311 and the object 301 may be adjusted. Depending on the position of the lens 311, the object 301 may be focused or defocused. For example, if the distance between the lens 311 and the object 301 is relatively short, the lens 311 may be out of an in-focus position to focus on the object 301, and phase differences may be generated between images captured by the CMOS image sensor 320. The lens driver 313 may move the lens 311 in a direction in which the distance of the lens 311 from the object 301 increases, based on the control signal provided by the processor 330. Alternatively, if the distance between the lens 311 and the object 301 is relatively long, the lens 311 may be out of the in-focus position, and phase differences may be generated between images formed on the CMOS image sensor 320. The lens driver 313 may move the lens 311 in the direction in which the distance of the lens 311 from the object 301 decreases, based on the control signal provided by the processor 330.

The CMOS image sensor 320 may convert an incident light into an image signal. An optical signal transmitted through the lens 311 and the IRIS 315 reaches a light-receiving surface of the pixel array 321 and may form an image of a subject or object thereon.

The pixel array 321 may be a Complementary metal oxide semiconductor Image Sensor (CIS) that converts the optical signal into an electrical signal. Sensitivity and the like of the pixel array 321 may be adjusted by the controller 323. The pixel array 321 may include a plurality of pixels including a plurality of image sensing pixels and a plurality of phase detection pixels.

In some example embodiments, the plurality of phase detection pixels may be arranged in the pixel array 321 of a tetra-cell structure, e.g., a structure implemented using shared pixels including a plurality of sub-pixels to provide a wide dynamic range and a phase difference AF function. For example, within the pixel array 321, a pixel group may include a plurality of sub-pixels and at least some of the sub-pixels in the pixel group may share at least one of a reset transistor, a source follower transistor, and a selecting transistor. In this implementation, each pixel group may include four sub-pixels and four photodiodes corresponding to each sub-pixel, but example embodiments are not limited thereto.

Figure 5:
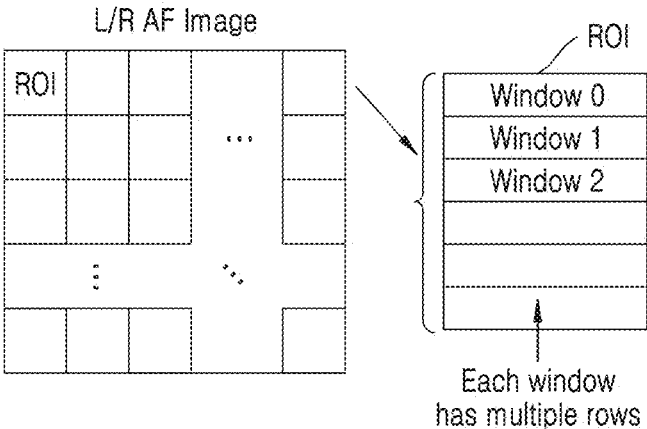
FIG. 5 illustrates a diagram depicting an example Left-right (L/R) AF image captured by the CMOS image sensor, according to some example embodiments.

The processor 330 is configured to perform various operations as disclosed below in FIGS. 5, 6, and 8 of the drawings. The processor 330 is operatively coupled to the CMOS image sensor 320 for processing, executing, or performing a set of operations to estimate an AF disparity in the CMOS image sensor 320. The processor 330 may include specialized processing units such as integrated system (e.g., bus) controllers, memory management control units, floating point units, graphics processing units, digital signal processing units, etc., but example embodiments are not limited thereto. In some example embodiments, the processor 330 may include the CPU, a graphics processing unit (GPU), or both. The processor 330 may be one or more general processors, digital signal processors, application-specific integrated circuits, field-programmable gate arrays, digital circuits, analog circuits, combinations thereof, or other now-known or later-developed devices for analyzing and processing data. The processor 330 may execute one or more instructions, such as code generated manually (e.g., programmed) to perform one or more operations disclosed herein. Further, among other capabilities, the processor 330 is configured to fetch and execute computer-readable instructions and data stored in the memory 350.

The processor 330 may acquire pixel data including left AF pixel data and right phase AF pixel data from the pixel array of the CMOS image sensor 320 to estimate the AF disparity in the CMOS image sensor 320. The term "left AF pixel data" may also be referred to as "left AF phase pixel data" and the term "right phase AF pixel data" may also be referred to as "right AF pixel data" without deviating from the scope of the present inventive concepts. The plurality of phase detection pixels included in the pixel array 321 may be used to focus on an object. The plurality of phase detection pixels may generate phase signals. The phase signals may include information associated with positions of images formed on the CMOS image sensor 320. Accordingly, the phase signals may be used to estimate the AF disparity between images. The processor 330 may output a control signal to the lens driver 313 to move the position of the lens 311 based on the estimated AF disparity.

The processor 330 may pre-process each of the left AF pixel data and the right phase AF pixel data using the SMC module 325 and generate a difference channel signal and a sum channel signal based on the processed left AF pixel data and the processed right AF pixel data. In addition, the processor 330 may filter each of the difference channel signal and the sum channel signal using a noise removal filter and calculate a First-Order Derivative (FOD) of the sum channel signal using a low-order Finite Impulse Response (FIR) filter. Also, the processor 330 may generate a T-processing signal based on a product of the filtered difference channel signal and the filtered sum channel signal and thereby determine, within the generated T-processing signal, a plurality of peak locations that exceeds a dynamic threshold (or desired) value. Using the plurality of peak locations and the calculated FOD of the sum channel signal, the processor 330 may estimate the AF disparity in the CMOS image sensor 320. In FIG. 3, the processor 330 and the image sensor 320 are shown as being separated, but the image sensor 320 may also include the processor 330.

The display unit 340 is also referred to as a display screen or a graphical user interface. The display unit 340 may be any output device that can visually present information to a user of the camera autofocus system 300. A purpose of the display unit 340 is to render images captured by the CMOS image sensor 320 and provide a user interface for interacting with the camera autofocus system 300.

The memory 350 includes one or more computer-readable storage media. The memory may, in some example embodiments, be considered a non-transitory storage medium. The term "non-transitory" may indicate that the storage medium is not embodied in a carrier wave or a propagated signal.

However, the term "non-transitory" should not be interpreted to mean that the memory is non-movable. In some example embodiments, a non-transitory storage medium may store data that can, over time, change (e.g., in Random Access Memory (RAM) or cache. The memory 350 may be communicatively coupled with the processor 330 and may further include any non-transitory computer-readable medium known in the art including, for example, volatile memory, such as static random-access memory (SRAM) and dynamic random-access memory (DRAM).

In some example embodiments, the term "module(s)" or "unit(s)" used herein may imply a unit including, for example, one of hardware, software, and firmware or a combination of two or more of them. The "module(s)" or "unit(s)" may be interchangeably used with a term such as logic, a logical block, a component, and the like. The "module(s)" or "unit(s)" may be a minimum (or any kind of) device component for performing one or more functions or maybe a part thereof.

Although FIG. 3 shows the hardware elements of the camera autofocus system 300, it is to be understood that other example embodiments are not limited thereon. In some example embodiments, the camera autofocus system 300 may include less or more number of elements. Further, the labels or names of the elements are used only for illustrative purposes and do not limit the scope of the present inventive concepts. One or more components can be combined together to perform same or substantially similar function for estimating the AF disparity in the CMOS image sensor 320.

Figure 4:
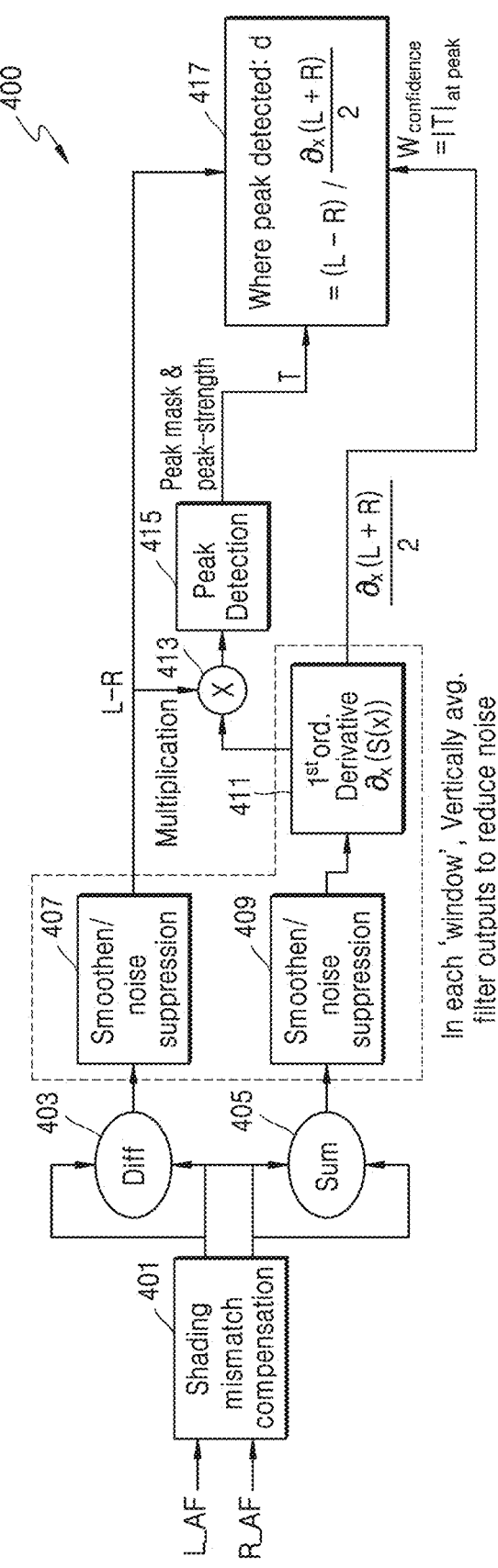
FIG. 4 is a block diagram depicting an example flow of a method for estimating the AF disparity in the CMOS image sensor, according to an example embodiment.

FIG. 4 is a block diagram depicting a first example flow of a method 400 for estimating the AF disparity in the CMOS image sensor, according to some example embodiment. As shown in FIG. 4, the method 400 comprises a series of operation steps 401 through 417 that are performed by the processor 330 in conjunction with the components of the CMOS image sensor 320.

The method 400 begins with operation step 401. At the operation step 401, the processor 330 acquires, corresponding to each window of a Left-Right (L/R) AF image captured by the CMOS image sensor 320, the pixel data including left phase AF pixel data (L_AF) and right phase AF pixel data (R_AF) from the pixel array 321 of the CMOS image sensor 320, and pre-processes the left AF pixel data and the right phase AF pixel data using the SMC module 325. The SMC module 325 may comprise a single filter for pre-processing the left AF pixel data and the right phase AF pixel data. FIG. 5 illustrates a diagram depicting an example of the L/R AF image captured by the CMOS image sensor 320 including the pixel data. As can be seen from FIG. 5, each window of the L/R AF image may have multiple rows corresponding to a Region of Interest (ROI) within the L/R AF image. The preprocessing is performed on each of the ROI to remove a mismatch between the left AF pixel data and right phase AF pixel data of each window that may occur due to a manufacturing defect. For example, the preprocessing of the pixel data including left AF pixel data and right phase AF pixel data, results in mitigating a shading profile mismatch between the left AF pixel data and right phase AF pixel data. For preprocessing the pixel data, at first, the processor 330 determines a difference between a luminance profile of the left AF pixel data and a luminance profile of the right phase AF pixel data and then using the SMC module, the processor 330 mitigates the shading profile mismatch between the left AF pixel data and right phase AF pixel data based on the determined difference.

Further, at operation step 403, the processor 330 generates the difference channel signal (LR_diff) based on the pre-processed pixel data of the L/R AF image. Simultaneously, at operation step 405, the processor 330 generates the sum channel signal (LR_avg) based on the pre-processed pixel data of the L/R AF image. In a non-limiting example embodiment, the difference channel signal corresponds to a first image signal that indicates a difference (L−R) between the pre-processed left AF pixel data and the pre-processed right AF pixel data. Similarly, the sum channel signal corresponds to a second image signal that indicates a sum (e.g., an average of a sum of the pixel signal i.e., ½*(L+R)) of the pre-processed left AF pixel data and the pre-processed right AF pixel data. In order to generate the difference channel signal and the sum channel signal, at first the processor 330 calculates a difference between the pre-processed left AF pixel data and the pre-processed right AF pixel data. Secondly, the processor 330 calculates a sum of the processed left AF pixel data and the processed right AF pixel data. Lastly, the processor 330 generates the difference channel signal and the sum channel signal based on the calculated difference and the calculated sum. Once the difference channel signal and the sum channel signal are generated, the flow of the method 400 proceeds to operation steps 407 and 409.

At operation steps 407 and 409, the processor 330 filters the difference channel signal and the sum channel signal using a noise removal filter, respectively. In a non-limiting example embodiment, the noise removal filter corresponds to a hybrid filter that is a combination of a first-order-derivative based filter and a Finite Impulse Response (FIR) filter. Once the difference channel signal and the sum channel signal are filtered, the flow of the method 400 proceeds to operation step 411.

At operation step 411, the processor 330 calculates a First-Order Derivative (FOD) $\partial_x(LR_{avg})$ of the sum channel signal using the low-order FIR filter. The FOD of the sum channel signal corresponds to a low-cost approximation of first order derivative of the sum channel signal and can be given as shown below in equation (1).

$$\partial_x(S(x)) = \frac{\partial_x(L+R)}{2} \tag{1}$$

Once the FOD of the sum channel signal is calculated by the processor 330, the flow of the method 400 proceeds to operation step 413.

At operation step 413, the processor 330 performs a product of the filtered difference channel signal and the filtered sum channel signal in order to generate the T-processing signal. In a non-limiting example embodiment, the generated T-processing signal corresponds to a function of a product of the filtered difference channel signal and the filtered sum channel signal. Once the T-processing signal is generated by the processor 330, the flow of the method 400 proceeds to operation step 415.

At operation step 415, the processor 330 determines, within the generated T-processing signal, the plurality of peak locations that exceed the dynamic threshold (or desired) value. In a non-limiting example embodiment, the plurality of peak locations may correspond to specific boundaries of one or more spatial scenes within the L/R AF image. After the detection of the plurality of peak locations, the flow of the method 400 proceeds to operation step 417.

At operation step 417, the processor 330 estimates the AF disparity in the CMOS image sensor 320 based on the determined plurality of peak locations and the calculated FOD of the sum channel signal. For example, the processor 330 estimates the AF disparity in the CMOS image sensor 320 at each peak location among the plurality of peak locations and fuses them based on a respective peak strength (e.g., which is used as a confidence metric). For example, for an ROI within the L/R AF image, a disparity value can be given as shown below in equation (2).

$$d_{ROI} = fn\left(\{d_i, w_{confidence_i}\}_{i \in no.\ of\ peaks}\right) \tag{2}$$

where multiple weighting schemes of 'd' can be used, such as a weighted mean of $\{d, w_{confidence}\}$, or a Maximum-weight of $\{d, w_{confidence}\}$, or other such estimators.

Considering a disparity value at any point 'x' in the L/R AF image, a point of inflection at any edges ($s_1$ and $s_2$) are maximum. Thus, the disparity value at any point 'x' in the L/R AF image can be given as shown below in equation 3.

$$d = \frac{L(x) - R(x)}{\frac{(L'(x) + R'(x))}{2}} = \frac{L - R}{\left(\frac{\partial_x(L+R)}{2}\right)(x)} \tag{3}$$

where, at each location/coordinate x in the image, $LR_{diff}$=L−R indicates a difference between the left AF image pixel value and right AF image pixel value, $$LR_{avg} = \frac{L+R}{2}$$

indicates an average (e.g., the sum of left AF image pixel value and right AF image pixel value), $\partial_x(LR_{avg})$ indicates FOD of $LR_{avg}$, and $$d = \frac{LR_{diff}}{LR_{avg}}$$

is an estimate of the disparity at that coordinate x in the L/R AF image.

Thus, to estimate the AF disparity in the CMOS image sensor, the processor 330 at first determines, based on a ratio of the sum channel signal and the FOD of the sum channel signal, each of corresponding disparity values in the ROI corresponding to each peak location among the plurality of peak locations. Thereafter, the processor 330 estimates the AF disparity in a collection of regions of interest in the CMOS image sensor 320 as a function of the determined corresponding disparity values. As shown in the above example equation 3, the function of the determined corresponding disparity values may correspond to a weighted mean of the determined corresponding disparity values in the ROI corresponding to each peak location among the plurality of peak locations within the L/R AF image.

Figure 6:
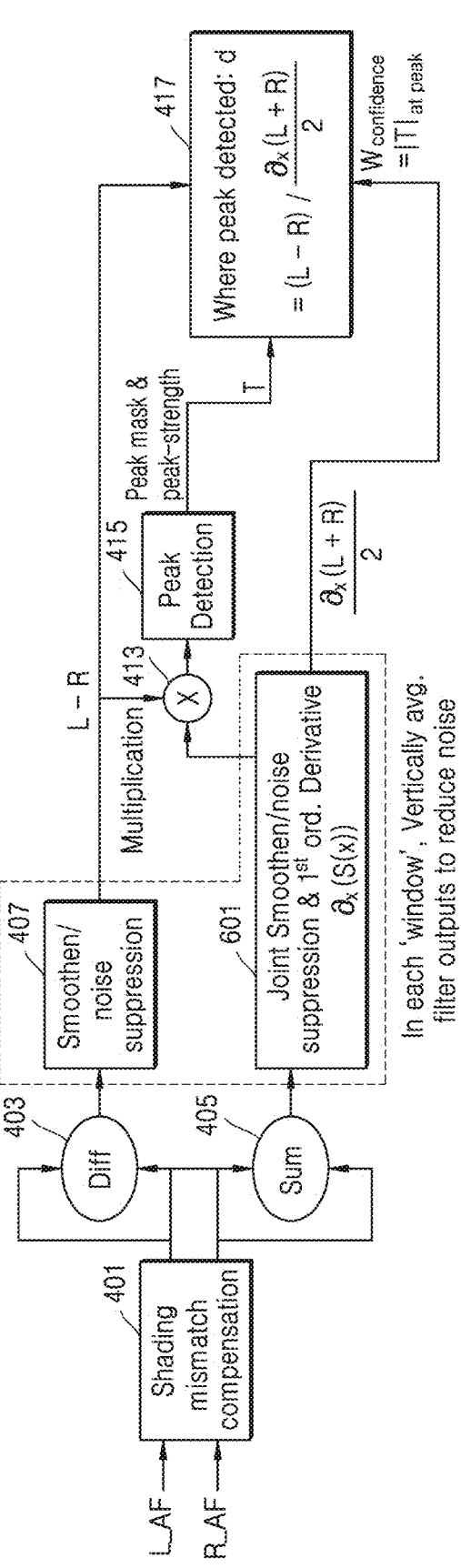
FIG. 6 is a block diagram depicting a second example flow of the method for estimating the AF disparity in the CMOS image sensor, according to some example embodiment.

Further, referring to FIG. 6 illustrates a block diagram depicting a second example flow of the method 400 for estimating the AF disparity in the CMOS image sensor 320, according to some example embodiments. It is to be noted that the second example flow of the method 400 is similar to the first example flow of the method 400 and only differs in terms of operation step 601. Therefore, a detailed description of the operation steps of FIG. 6 that are similar to the operation steps of FIG. 4 is omitted herein for the sake of brevity. The operation step 601 differs from the operation steps 409 and 411 of the method 400 of FIG. 4 in terms of execution of the operation steps 409 and 411. According to some example embodiments as shown in FIG. 6, the processor 330, at operation step 601, may jointly perform the filtering of the sum channel signal and the calculation of the FOD of the sum channel signal. For example, at operation step 601, the processor 330 may use an average filter vertically for each 'window' of the L/R AF image to reduce noise from the sum channel signal.

FIG. 7 illustrates a sequence flow chart depicting a method 700 for estimating the AF disparity in the CMOS image sensor 320, according to some example embodiments. The method 700 is similar to the method 400 and hence will be described in brief for the sake of brevity. For example, FIG. 7 illustrates another version of method 400 in the form of a sequence flow diagram instead of a block diagram-based representation.

Referring to FIG. 7, at operation step 701, the processor 330 acquires the left AF pixel data and right phase AF pixel data from the pixel array 321 of the CMOS image sensor 320.

At operation step 703, the processor 330 pre-processes each of the left AF pixel data and the right phase AF pixel data using the SMC module 325.

At operation step 705, the processor 330 generates the difference channel signal and the sum channel signal based on the processed left AF pixel data and the processed right AF pixel data.

At operation step 707, the processor 330 filters each of the difference channel signal and the sum channel signal using the noise removal filter.

At operation step 709, the processor 330 calculates the FOD of the sum channel signal using the low-order FIR filter.

At operation step 711, the processor 330 generates the T-processing signal based on the product of the filtered difference channel signal and the filtered sum channel signal.

At operation step 713, the processor 330 generates the T-processing signal based on the product of the filtered difference channel signal and the filtered sum channel signal.

At operation step 715, the processor 330 estimates the AF disparity in the CMOS image sensor based on the determined plurality of peak locations and the calculated FOD of the sum channel signal.

The various actions, acts, blocks, steps, or the like in the method may be performed in the order presented, in a different order, or simultaneously. Further, in some example embodiments, some of the actions, acts, blocks, steps, or the like may be omitted, added, modified, skipped, or the like without departing from the scope of the present inventive concepts.

Referring now to some technical abilities and effectiveness of the above-disclosed methods and the camera autofocus system 300, the present inventive concepts provide various technical advantages over the conventional camera autofocus methods and systems. The methods disclosed above use L/R or Top-Bottom (T/B) AF signals of the L/R AF image without a cost function to estimate the disparity in the CMOS image sensor. As a result, the above-disclosed methods' computational complexity does not scale with an increasing range of disparities to be estimated. Additionally, as per the flow of order in which the above-disclosed operations of the methods 400 and 700 are being performed, a zero-disparity point coincides with maximum (or desired) sharpness and hence avoids (or reduces or prevents) a need for zero-error calibration.

For example, the above-disclosed methods may provide a quicker auto-focus and may estimate ranges of larger focus disparities without an increase in a chip area of the camera autofocus system 300. Also, for the above-disclosed methods 400 and 700, a reduced (or smaller) data bandwidth is required (or used) as only one disparity value per window (e.g., optional confidence value) needs to be transmitted through Mobile Industry Processor Interface (MIPI) (e.g., sensor output I/F) during an application of the methods 400 and 700. Also, with the help of the above-disclosed methods, a higher density disparity (e.g., 2×/4×/etc. resolutions) is possible at little-to-no (or reduced) compute/logic cost.

Further, in accordance with the some example embodiments, the present inventive concepts can be applied to photography applications, videography applications, and Always-ON (AON) applications (e.g., QR code focusing, bar code focusing etc.).

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While specific language has been used to describe the above, any limitations arising on account of the same are not intended. As would be apparent to a person in the art, various working modifications may be made to the method in order to implement the inventive concepts as taught herein.

The drawings and the forgoing description give examples of various example embodiments. Those skilled in the art will appreciate that one or more of the described elements may well be combined into a single functional element. Alternatively, certain elements may be split into multiple functional elements. Elements from one example embodiment may be added to another example embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel (e.g., at the same time) with the other acts. The scope of some example embodiments is by no means limited by these specific examples. Numerous variations, whether explicitly given in the specification or not, such as differences in structure, dimension, and use of material, are possible. The scope of some example embodiments is at least as broad as given by the following claims.

Benefits, other advantages, and solutions to problems have been described above with regard to some example embodiments. However, benefits, advantages, solutions to problems, and any component(s) that may cause any benefit, advantage, or solution to occur or become more pronounced are not to be construed as a critical, required, or essential feature or component of any or all the claims.

We claim:
1. A method for estimating an Auto-Focus (AF) disparity in a Complementary Metal-Oxide-Semiconductor (CMOS) image sensor, the method comprising:

acquiring left phase AF pixel data and right phase AF pixel data from a pixel array of the CMOS image sensor;

pre-processing each of the left phase AF pixel data and the right phase AF pixel data using a left-to-right pixel shading mismatch compensation (SMC) module;

generating a difference channel signal and a sum channel signal based on the processed left phase AF pixel data and the processed right phase AF pixel data;

filtering each of the difference channel signal and the sum channel signal using a noise removal filter;

calculating a First-Order Derivative (FOD) of the sum channel signal using a low-order Finite Impulse Response (FIR) filter;

generating a T-processing signal based on a product of the filtered difference channel signal and the filtered sum channel signal;

determining, within the generated T-processing signal, a plurality of peak locations that exceeds a dynamic threshold value; and estimating the AF disparity in the CMOS image sensor based on the determined plurality of peak locations, the filtered difference channel signal, and the calculated FOD of the sum channel signal.

2. The method of claim 1, wherein the pre-processing of the left phase AF pixel data and the right phase AF pixel data comprises:

determining a difference between a luminance profile of the left phase AF pixel data and a luminance profile of the right phase AF pixel data; and mitigating, using the SMC module, a shading profile mismatch between the left phase AF pixel data and right phase AF pixel data based on the determined difference.

3. The method of claim 1, wherein:

the difference channel signal corresponds to a first image signal that indicates a difference between the processed left phase AF pixel data and the processed right phase AF pixel data, and the sum channel signal corresponds to a second image signal that indicates a sum of the processed left phase AF pixel data and the processed right phase AF pixel data.

4. The method of claim 1, wherein the noise removal filter corresponds to a hybrid filter that is a combination of a first-order-derivative based filter and the low-order FIR filter.

5. The method of claim 1, wherein the generating the difference channel signal and the sum channel signal comprises:

calculating a difference between the processed left phase AF pixel data and the processed right phase AF pixel data;

calculating a sum of the processed left phase AF pixel data and the processed right phase AF pixel data; and generating the difference channel signal and the sum channel signal based on the calculated difference and the calculated sum.

6. The method of claim 1, wherein the FOD of the sum channel signal corresponds to a low-cost approximation of the first-order derivative of the sum channel signal.

7. The method of claim 1, wherein the estimation of the AF disparity in the CMOS image sensor comprises:

determining, based on a ratio of the sum channel signal and the FOD of the sum channel signal, each of corresponding disparity values in a Region of Interest

14

(ROI) corresponding to each peak location among the plurality of peak locations; and estimating the AF disparity in a collection of regions of interest in the CMOS image sensor as a function of the determined corresponding disparity values.

8. The method of claim 7, wherein the function of the determined corresponding disparity values corresponds to a weighted mean of the determined corresponding disparity values in the ROI corresponding to each peak location among the plurality of peak locations.

9. A camera autofocus system, comprising:

a Complementary Metal-Oxide-Semiconductor (CMOS) image sensor including a pixel array;

a left-to-right pixel shading mismatch compensation (SMC) module; and at least one processor communicatively coupled with the CMOS image sensor and the SMC module, wherein the at least one processor is configured to acquire left phase Auto-Focus (AF) pixel data and right phase Auto-Focus (AF) pixel data from the pixel array of the CMOS image sensor;

pre-process each of the left phase AF pixel data and the right phase AF pixel data using the SMC module;

generate a difference channel signal and a sum channel signal based on the processed left phase AF pixel data and the processed right phase AF pixel data;

filter each of the difference channel signal and the sum channel signal using a noise removal filter;

calculate a First-Order Derivative (FOD) of the sum channel signal using a low- order Finite Impulse Response (FIR) filter;

generate a T-processing signal based on a product of the filtered difference channel signal and the filtered sum channel signal;

determine, within the generated T-processing signal, a plurality of peak locations that exceeds a dynamic threshold value; and estimate an Auto-Focus (AF) disparity in the CMOS image sensor based on the determined plurality of peak locations, the filtered difference channel signal, and the calculated FOD of the sum channel signal.

10. The system of claim 9, wherein to pre-process the left phase AF pixel data and the right phase AF pixel data, the at least one processor is configured to:

determine a difference between a luminance profile of the left phase AF pixel data and a luminance profile of the right phase AF pixel data; and mitigate, using the SMC module, a shading profile mismatch between the left phase AF pixel data and right phase AF pixel data based on the determined difference.

11. The system of claim 9, wherein, the difference channel signal corresponds to a first image signal that indicates a difference between the processed left phase AF pixel data and the processed right phase AF pixel data, and the sum channel signal corresponds to a second image signal that indicates a sum of the processed left phase AF pixel data and the processed right phase AF pixel data.

12. The system of claim 9, wherein the noise removal filter corresponds to a hybrid filter that is a combination of a first-order-derivative based filter and the low-order FIR filter.

13. The system of claim 9, wherein to generate the difference channel signal and the sum channel signal, the at least one processor is configured to:

calculate a difference between the processed left phase AF pixel data and the processed right phase AF pixel data;

calculate a sum of the processed left phase AF pixel data and the processed right phase AF pixel data; and generate the difference channel signal and the sum channel signal based on the calculated difference and the calculated sum.

14. The system of claim 9, wherein the FOD of the sum channel signal corresponds to a low-cost approximation of the first order derivative of the sum channel signal.

15. The system of claim 9, wherein to estimate the AF disparity in the CMOS image sensor, the at least one processor is configured to:

determine, based on a ratio of the sum channel signal and the FOD of the sum channel signal, each of corresponding disparity values in a Region of Interest (ROI) corresponding to each peak location among the plurality of peak locations; and estimate an AF disparity in a collection of regions of interest in the CMOS image sensor as a function of the determined corresponding disparity values.

16. The system of claim 15, wherein the function of the determined corresponding disparity values corresponds to a weighted mean of the determined corresponding disparity values in the ROI corresponding to each peak location among the plurality of peak locations.

17. A Complementary Metal-Oxide-Semiconductor (CMOS) image sensor, comprising:

a pixel array;

a left-to-right pixel shading mismatch compensation (SMC) module; and at least one processor operatively coupled to the SMC module, wherein the at least one processor is configured to acquire left phase Auto-Focus (AF) pixel data and right phase Auto-Focus (AF) pixel data from the pixel array;

pre-process each of the left phase AF pixel data and the right phase AF pixel data using the SMC module;

generate a difference channel signal and a sum channel signal based on the processed left phase AF pixel data and the processed right phase AF pixel data;

filter each of the difference channel signal and the sum channel signal using a noise removal filter;

calculate a First-Order Derivative (FOD) of the sum channel signal using a low- order Finite Impulse Response (FIR) filter;

generate a T-processing signal based on a product of the filtered difference channel signal and the filtered sum channel signal;

determine, within the generated T-processing signal, a plurality of peak locations that exceeds a dynamic threshold value; and estimate an Auto-Focus (AF) disparity in the CMOS image sensor based on the determined plurality of peak locations, the filtered difference channel signal, and the calculated FOD of the sum channel signal.

18. The CMOS image sensor of claim 17, wherein to pre-process the left phase AF pixel data and the right phase AF pixel data, the at least one processor is configured to:

determine a difference between a luminance profile of the left phase AF pixel data and a luminance profile of the right phase AF pixel data; and mitigate, using the SMC module, a shading profile mismatch between the left phase AF pixel data and right phase AF pixel data based on the determined difference.

19. The CMOS image sensor of claim 17, wherein the noise removal filter corresponds to a hybrid filter that is a combination of a first-order-derivative based filter and the low-order FIR filter.

20. The CMOS image sensor of claim 17, wherein to generate the difference channel signal and the sum channel signal, the at least one processor is configured to:

calculate a difference between the processed left phase AF pixel data and the processed right phase AF pixel data;

calculate a sum of the processed left phase AF pixel data and the processed right phase AF pixel data; and generate the difference channel signal and the sum channel signal based on the calculated difference and the calculated sum.

* * * * *